June 4, 1929.   P. N. BOSSART   1,715,446
ELECTRICAL MEASURING APPARATUS
Filed June 18, 1925
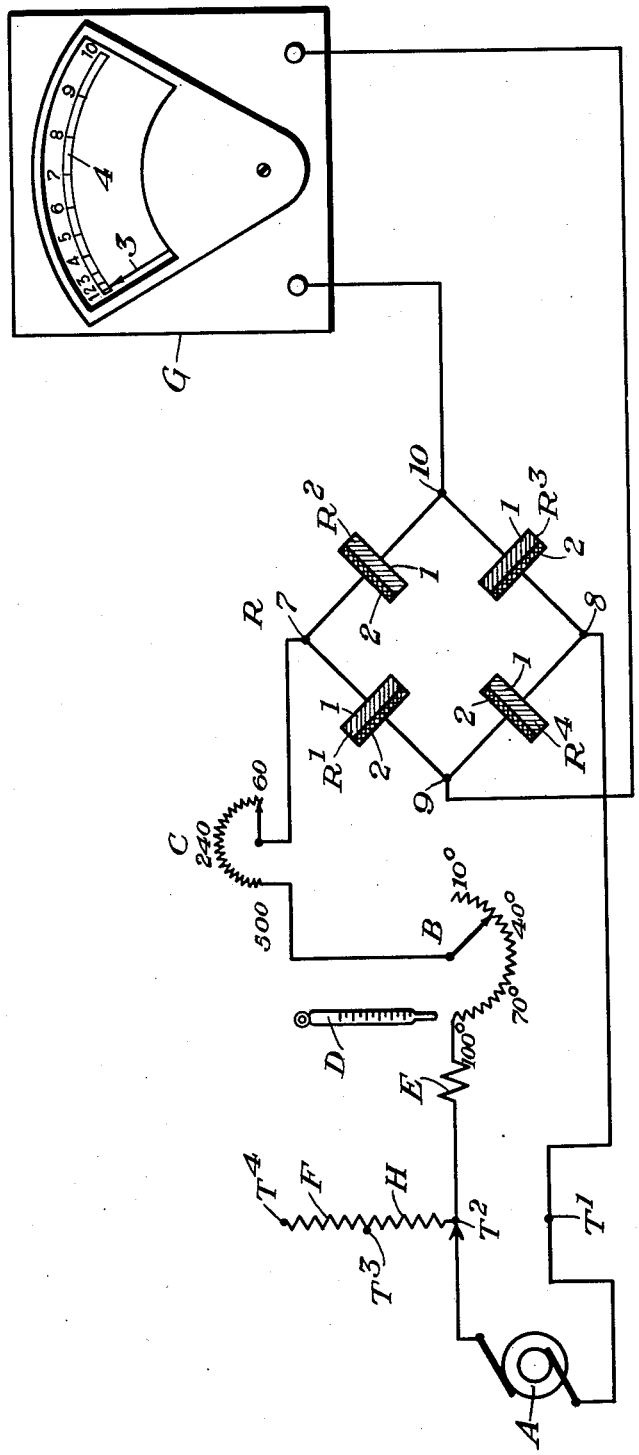
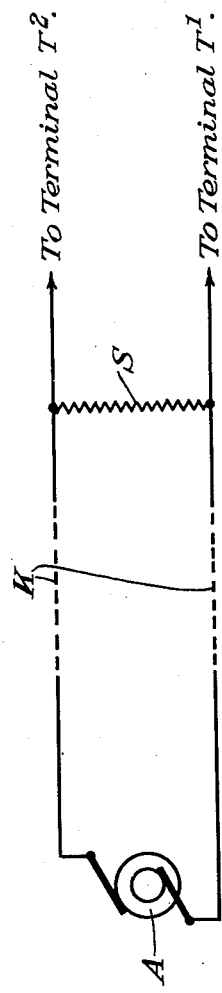
INVENTOR:
P. N. Bossart,
BY A. R. Vencill
His ATTORNEY Patented June 4, 1929.

1,715,446

UNITED STATES PATENT OFFICE.

PAUL N. BOSSART, OF SWISSVALE, PENNSYLVANIA, ASSIGNOR TO THE UNION SWITCH & SIGNAL COMPANY, OF SWISSVALE, PENNSYLVANIA, A CORPORATION OF PENNSYLVANIA.

ELECTRICAL MEASURING APPARATUS.

Application filed June 18, 1925. Serial No. 37,973.

My invention relates to electrical measuring apparatus, and particularly to apparatus of the type suitable for measuring alternating electrical currents and voltages.

I will describe one form of apparatus embodying my invention, and one modification thereof, and will then point out the novel features thereof in claims.

In the accompanying drawing, Fig. 1 is a view, largely diagrammatic, showing one form of electrical measuring apparatus embodying my invention. Fig. 2 is a fragmental view illustrating one modification of the apparatus shown in Fig. 1.

Similar reference characters refer to similar parts in both views.

Referring first to Fig. 1, the apparatus comprises a rectifier R which is connected with a source of alternating electromotive force, and an electrical measuring instrument G, responsive to direct current and supplied with energy from rectifier R.

The instrument G may be any form of sensitive galvanometer which will give deflections which are directly proportional to the current supplied to the instrument. I have found that a D'Arsonval galvanometer is a very satisfactory instrument for this purpose. This galvanometer comprises a pointer 3 biased to an initial position, and arranged to be deflected from this position by an amount which is proportional to the current supplied to the galvanometer.

The rectifier R comprises four asymmetric units $R'$, $R^2$, $R^3$ and $R^4$, each comprising a metallic member 1 such as a copper or iron plate, having a coating 2 of a compound such as an oxide of the metal formed directly thereon. A rectifier embodying asymmetric units of the type described is disclosed in Letters Patent of the United States No. 1640-335, granted to L. O. Grondahl on Aug. 23, 1927.

The output terminals 9 and 10 of the rectifier R are connected directly with the galvanometer G, and the input terminals 7 and 8 of the rectifier are connected, through certain non-inductive resistances, the purposes of which will appear hereinafter, with terminals $T'$ and $T^2$. The source of alternating electromotive force which it is desired to measure is connected with terminals $T'$ and $T^2$. As here shown this source is an alternator A.

It will be plain that alternating energy supplied to the rectifier R is changed to direct current by the rectifier, and the amount of this direct current is measured by the galvanometer G. The deflection of the galvanometer is therefore a measure of the electromotive force applied to the terminals 7 and 8.

Rectifiers of the type here shown and described have the characteristic of varying their direct current output approximately as the square of the alternating electromotive force applied thereto. I have discovered that by properly choosing and matching the various asymmetric units of the rectifier, and properly choosing the resistance and the range of the galvanometer, the parts may be adjusted so that over a considerable range the current delivered to the galvanometer G by the rectifier R varies as the square of the electromotive force applied to the rectifier to a precision comparable with that of the best commercial A. C. meters.

I provide the galvanometer with a scale 4 graduated in units which vary with the square root of the deflection of the pointer 3. It follows, therefore, that the readings of the galvanometer are a measure of the effective value of the electromotive force applied to terminals 7 and 8. It is plain that the electromotive force applied to terminals 7 and 8 is a predetermined portion of the electromotive force applied to terminals $T'$ and $T^2$. By properly choosing the units of the scale 4 and by properly proportioning the parts of the apparatus, the galvanometer may be made to read, directly in volts, the amount of the electromotive force applied to terminals $T'$ and $T^2$.

Since the direct current supplied by the rectifier R to galvanometer G varies as the square of the electromotive force applied to the rectifier, and since the galvanometer measures the average value of the current supplied thereto, the deflection of the pointer 3 of the galvanometer is a measure of the average value of the square of the electromotive force of alternator A. But the actual reading of this deflection as marked on the scale 4 gives the square root of this average. It follows that the apparatus measures the true root mean square value of the electromotive force applied to terminals $T'$ and $T^2$. One advantage of this feature is that the readings of the galvanometer give the true root mean square value of the electromotive force to be measured irrespective of the shape of the wave of this electromotive force.

By means of the resistance E interposed between the terminal T² and the rectifier R, the apparatus may be adjusted so that the electromotive force applied to the rectifier R is within the range over which the rectifier output current is most nearly proportional to the square of the applied electromotive force.

Rectifiers of the type described have a high temperature co-efficient of resistance so that for a given value of the alternating electromotive force supplied to the rectifier, the direct current flowing through galvanometer G decreases as the temperature of the rectifier is raised. By means of the variable resistance B, a small change may be made in the electromotive force applied to the terminals of the rectifier to compensate for variations in temperature, the effective resistance of B being decreased for increases in the temperature of the apparatus. As here shown the resistance B is calibrated directly in degrees and the adjustment may then be made so that the setting of the resistance B corresponds with the temperature indicated on a thermometer D adjacent the apparatus.

For very accurate results over a wide range of frequency, it may, under some conditions, be desirable to compensate for variations in the output of the rectifier due to variations in frequency. It has been discovered that for a given value of alternating electromotive force applied to the rectifier, the direct current through the galvanometer G decreases with increases in the frequency of this electromotive force. This variation is due in part to the charging current required by the capacity effect of the asymmetric units, and partly to the increased impedance of the galvanometer to the pulsating direct current supplied thereto. By slightly decreasing the resistance C in series with the input terminals of the rectifier for increased frequencies, these variations may be accurately compensated. For convenience, the resistance C may be calibrated directly in cycles per second.

The apparatus also comprises two multiplier resistances H and F connected with terminal T². These resistances are each proportioned, in the usual manner, to increase the range of the apparatus by a predetermined ratio. For example, if the source of electromotive force which it is desired to measure be connected with terminals T' and T³, it will be seen that multiplier resistance H is then included in series with the input circuit of the rectifier. Under these conditions, the true root mean square value of the alternating electromotive force applied to terminals T' and T² is equal to the reading of galvanometer G multiplied by the ratio corresponding to the multiplier H. Similarly if the unknown electromotive force be connected with terminals T' and T⁴, resistances F and H will both be connected in series with the input circuit of the rectifier and the true value of the unknown voltage is then obtained by multiplying the reading of the galvanometer by the proper multiplier constant corresponding to this connection.

It will be observed that by inserting the proper multiplier resistance in series with the input side of the rectifier, the electromotive force actually applied to the rectifier may be kept at all times within the range over which the output current corresponds most nearly to the square of the applied electromotive force, and the apparatus is equally accurate over all values of voltage applied to the terminals of the apparatus.

Referring now also to Fig. 2, I have illustrated how the apparatus may be utilized to measure alternating current values. The reference character K represents a circuit which is being supplied by alternator A with an alternating current which it is desired to measure. A non-inductive shunt S is interposed in this circuit, the value of this shunt being so chosen that the alternating potential drop across its terminals is within the limited range of electromotive force for which the apparatus of Fig. 1 is most sensitive. The terminals of shunt S are then connected with terminals T' and T² of the apparatus shown in Fig. 1 and the amount of this potential drop across shunt S is measured as any other alternating electromotive force is measured. Knowing the potential drop across the shunt and the resistance of the shunt, the current through the shunt is of course equal to the quotient of the former divided by the latter.

One advantage of my invention is that by properly choosing the value of the shunt S, alternating currents of any reasonable magnitude may be measured with great accuracy. It should be pointed out that since the input circuit of the rectifier R, and the shunt S connected in parallel therewith, both have unity power factor, the division of current between these two circuits will be substantially independent of the frequency of the current, and that the accuracy of the apparatus is therefore not greatly impaired by variations in the frequency of the unknown current. Attention should also be directed to the fact that the apparatus measures the root mean square values of the current through the shunt for the same reasons that it measures the root mean square value of the alternating electromotive force applied to terminals T' and T².

I have found that though the apparatus may be made very sturdy and rugged in construction with no delicate parts the adjustment of which is easily disturbed, greater sensitivity may be obtained with measuring apparatus embodying my invention than with any form of measuring apparatus not using a local power source and at present commercially available. Measuring apparatus embodying my invention does not require external batteries or facilities for calibration involving extra energy sources. Furthermore, a readily hand-operable instrument embodying my invention will measure either alternating current volts or alternating current amperes of any value from a value lower than portable meters are now built, up to values so large that the limiting range is the heating and weight of the series resistance or shunt used with the meter. As an alternating current volt meter the ohms per volt may be about one hundred times higher than high resistance dynamometer instruments now on the market, and as an alternating current ammeter the resistance of the instrument is about thirty times lower than that of the commercial alternating current ammeter. An instrument embodying my invention has no parts having limited life, the calibration is permanent, and the instrument has great momentary overload capacity not being easily burned out; this last feature is an important advantage in measuring very small electrical quantities.

Although I have herein shown and described only one form of electrical measuring apparatus embodying my invention and only one modification thereof, it should be pointed out that various changes and modifications may be made therein within the scope of the appended claims without departing from the spirit and scope of my invention.

Having thus described my invention, what I claim is:

1. In combination, a source of alternating electromotive force, an electrical measuring instrument responsive to direct current, and a rectifier interposed between said source and said instrument and having the characteristic of varying its direct current output in accordance with the square of the alternating electromotive force applied thereto.

2. In combination, a source of alternating electromotive force, an electrical measuring instrument comprising a movable pointer biased to an initial position and arranged to be deflected from said initial position by amounts which are directly proportional to the magnitude of the direct current supplied to the instrument, a fixed scale cooperating with said pointer and calibrated in units which vary as the square root of the deflections of the pointer, and a rectifier interposed between said source and said instrument and having the characteristic of varying its direct current output in accordance with the square of the alternating electromotive force applied thereto.

3. Electrical apparatus for measuring alternating electrical current, comprising a rectifier receiving the current to be measured and having the characteristic of varying its direct current output in accordance with the square of the alternating electromotive force applied thereto, and an electrical measuring instrument receiving direct current from said rectifier and having a scale calibrated according to the square root of the instrument deflection.

4. In combination, a source of alternating electromotive force, a rectifier receiving current from said source and having the characteristic of varying its direct current output in accordance with the square of the alternating electromotive force supplied thereto, a D'Arsonval galvanometer receiving direct current from said rectifier, and a scale for said galvanometer graduated in units which vary with the square root of the deflection of said galvanometer.

5. In combination, a source of alternating current, a rectifier receiving current from said source and having the characteristic of decreasing its direct current output in accordance with increases in the frequency of the alternating current supplied thereto, an electrical measuring instrument receiving current from said rectifier, and a variable resistance interposed between said rectifier and said source for compensating for variations in the frequency of the alternating electromotive force applied to the rectifier.

6. Apparatus for measuring alternating electromotive forces comprising a rectifier having the characteristic of varying its electrical output in accordance with the square of the alternating electromotive force applied thereto within a limited range of such electromotive force, an electrical measuring instrument receiving current from said rectifier and graduated to measure the square root of the current supplied to such instrument, a plurality of resistances, and means for supplying the electromotive force to be measured to said rectifier through a selected number of such resistances, whereby the electromotive force actually applied to such rectifier is within said limited range.

7. Apparatus for measuring the root mean square value of an alternating electromotive force and comprising a copper oxide rectifier, means for applying such electromotive force to said rectifier, and an electrical measuring instrument receiving current from said rectifier and responsive directly to the value of the current supplied thereto but calibrated in units which vary as the square root of the instrument deflection.

8. In combination, a source of alternating electromotive force, a copper oxide rectifier receiving current from said source, and a D'Arsonval galvanometer receiving current from said rectifier and calibrated in units which vary as the square root of the galvanometer deflection.

In testimony whereof I affix my signature.

PAUL N. BOSSART